United States Patent
Weitzel

(10) Patent No.: US 6,706,805 B2
(45) Date of Patent: Mar. 16, 2004

(54) USE OF COPOLYMERS OF VINYL ESTER, (METH)ACRYLIC ESTER AND OPTIONALLY ETHYLENE COMONOMERS IN BUILDING MATERIALS

(75) Inventor: Hans-Peter Weitzel, Reischach (DE)

(73) Assignee: Wacker Polymer Systems, GmbH & Co. KG, Burghausen (DE)

( * ) Notice: Subject to any disclaimer, the term of this patent is extended or adjusted under 35 U.S.C. 154(b) by 0 days.

(21) Appl. No.: 10/153,099

(22) Filed: May 22, 2002

(65) Prior Publication Data

US 2003/0065079 A1 Apr. 3, 2003

(30) Foreign Application Priority Data

May 31, 2001 (DE) ......................... 101 26 560

(51) Int. Cl.$^7$ ............................... C08F 218/04
(52) U.S. Cl. .............................. 524/563; 524/5; 524/4; 524/560; 524/503; 524/557; 524/803; 526/87; 106/724; 106/802
(58) Field of Search ............... 524/5, 4, 560, 524/563, 503, 557, 803; 526/87; 106/724, 802

(56) References Cited

U.S. PATENT DOCUMENTS

| | | |
|---|---|---|
| 5,391,608 A | 2/1995 | Mudge et al. |
| 5,439,960 A | 8/1995 | Mudge et al. |
| 5,747,578 A * | 5/1998 | Schmitz et al. ............. 524/502 |
| 5,763,508 A | 6/1998 | Hess et al. |
| 6,166,113 A * | 12/2000 | Haerzschel et al. ........... 524/5 |
| 2002/0035193 A1 | 3/2002 | Weitzel |

FOREIGN PATENT DOCUMENTS

| | | |
|---|---|---|
| DE | 199 62 566 A1 | 7/2001 |
| EP | 0 381 122 A2 | 1/1990 |

OTHER PUBLICATIONS

Derwent Abstract Corresponding To EP 1 110 978 [AN 2001–515952].
Derwent Abstract Correcsponding To DE 199 62 566 [AN 2001–515952].
Fox, T.G., Bull. Am. Physics Soc., 1, 3, pg. 123 [1956].
Polymer Handbook, $2^{nd}$ Edition, J. Wiley & Sons, New York, [1975].

* cited by examiner

Primary Examiner—Peter Mulcahy
Assistant Examiner—Satya Sastri
(74) Attorney, Agent, or Firm—Brooks Kushman P.C.

(57) ABSTRACT

Building materials containing copolymers derived from vinyl ester, (meth)acrylic ester and optionally ethylene comonomers, stabilized with a polyvinylalcohol protective colloid, as their aqueous dispersions or as redispersible polymer powders which are redispersible in water, exhibit improved processing properties and set properties. The copolymers are obtained by emulsion or suspension copolymerization in an at least two step process wherein a) the vinyl ester component is polymerized, optionally with ethylene and further copolymerizable comonomers, to a conversion of from 90 to 100% by weight in a first step, and b) the ester(s) of (meth)acrylic acid are subsequently added and polymerized in a second step.

The copolymer dispersion obtained may be dried to form a redispersible copolymer powder.

29 Claims, No Drawings

USE OF COPOLYMERS OF VINYL ESTER, (METH)ACRYLIC ESTER AND OPTIONALLY ETHYLENE COMONOMERS IN BUILDING MATERIALS

BACKGROUND OF THE INVENTION

1. Field of the Invention

The invention relates to the use of copolymers which are derived from vinyl ester, (meth)acrylic ester and optionally ethylene comonomers and are stabilized with a protective colloid, in the form of their aqueous dispersions or redispersible polymer powders, and their use in building materials, i.e. in mortar compositions.

2. Background Art

Polymers which are stabilized with protective colloids are often used in building materials in the form of their aqueous dispersions or as polymer powders which are redispersible in water. As protective colloids, use is generally made of polyvinyl alcohols. The use of polyvinyl alcohol is desirable because, in contrast to systems which are stabilized by low molecular weight compounds (emulsifiers), the polyvinyl alcohol itself also contributes to the strength of the cured (set) compositions, for example, to the tensile bond strength in tile adhesives. Preference has hitherto been given to using vinyl esters and ethylene as monomers for preparing redispersible powders, since the stabilization of acrylate copolymers or styrene-acrylate copolymers by polyvinyl alcohol is difficult to achieve. In particular, stabilizing an acrylate dispersion with polyvinyl alcohol alone in such a way that the resulting powders are blocking resistant and storage-stable is not a trivial exercise. The combination of vinyl ester and ethylene comonomers together with (meth)acrylate comonomers is also frequently unsatisfactory for the same reason. Aqueous dispersions prepared from such comonomers, for example, vinyl acetate-butyl acrylate copolymers or vinyl acetate-acrylate-ethylene copolymers, have been widely described. However, these dispersions are emulsifier-stabilized and cannot be spray dried to give redispersible powders.

When using the combination of vinyl esters with ethylene, the $T_g$ range which can be obtained is restricted to from about +30° C. (vinyl acetate homopolymer) to about −25° C. Higher glass transition temperatures cannot be obtained, since there is no monomer appropriate to the system which leads to glass transition temperatures higher than those obtained using vinyl acetate. Vinyl chloride is no longer acceptable for ecological reasons and its use as a comonomer has virtually ceased. On the other hand, glass transition temperatures below −25° C. can be obtained only with difficulty, since they require a proportion of ethylene significantly above 50 mol % of the monomer mixture. Although these high-ethylene polymers can be prepared, they tend to crystallize, so that a distinct glass transition is no longer found. Furthermore, these polymers do not display the highly elastic properties expected for such $T_g$ values. The combination of vinyl esters and ethylene with (meth)acrylates would easily enable the $T_g$ range to be extended to higher and lower $T_g$ values. The problems discussed heretofore relative to the preparation of such copolymer systems with purely polyvinyl alcohol stabilization which are suitable for producing redispersible powders stand in the way of such an extension.

Moreover, problems occur not only in the preparation but also in the use of the polymers. Particularly when using polymers in the form of their redispersion powders for improving mortar properties, a main application area for redispersion powders, the formulations have to remain stable for some time and their processing consistency must not change significantly, as indicated, for example, by viscosity stability or cement stability. Furthermore, the mechanical properties such as compressive strength, porosity and thus the air pore content, play an important role in the concrete and mortar industry. In addition, hydraulically setting systems which have been modified with the dispersion powder should give better adhesion compared to the unmodified or conventionally modified systems.

DE-A 19962566 discloses redispersible powders based on copolymers of vinyl esters and (meth)acrylates. In the method of preparation described there, all or some of the vinyl ester component is introduced into the polymerization vessel initially, and the (meth)acrylate component is metered in after commencement of polymerization. The polymerization is carried out at a relatively high temperature. This procedure has the disadvantage that the polymers obtainable in this way have relatively low molecular weights; the K value is less than 100. As a result, the mechanical properties are not fully satisfactory when these polymers are used in the building materials sector.

U.S. Pat. Nos. 5,391,608 and 5,439,960 describe polymer dispersions which are used for preparing wood adhesives having improved water resistance. The polymer dispersions are prepared by means of a process in which vinyl acetate is copolymerized with a post-crosslinking comonomer such as N-methylolacrylamide (NMA) in a first step and, after cooling the polymer dispersion, a methyl methacrylate polymer is polymerized by means of addition of methyl methacrylate.

EP-A 381122 describes the preparation of binders for the production of nonwovens. Here, copolymers of vinyl esters with comonomers such as methyl methacrylate or styrene which are incompatible therewith are prepared. Vinyl acetate and optionally ethylene is/are polymerized to a residual vinyl acetate content of <5% in a first step, and the incompatible monomer is subsequently metered in and polymerized.

SUMMARY OF THE INVENTION

The invention provides stable, low-viscosity dispersions stabilized by a protective colloid, and the corresponding dispersion powders which are redispersible in water, the polymers being prepared from vinyl ester monomers, ethylene monomers and (meth)acrylic ester monomers, and which exhibit fully satisfactory viscosity stability and cement stability when used in cement applications, which do not hinder the setting of the cement, and which display improved mechanical properties, in particular tensile bond strengths, and their use in adhesive mortars such as tile adhesives and mortars for composite thermal insulation systems.

It has surprisingly been found that two-phase polymerization of vinyl esters and optionally ethylene as one component, and (meth)acrylates as the other component, provides dispersions which, despite the presence of the (meth)acrylate homopolymer formed, can be spray dried to give redispersion powders which are blocking resistant and cement-stable. It has also surprisingly been found that good tensile bond strengths are obtained in adhesive mortars, in particular after wet storage and freeze thaw cycles.

DETAILED DESCRIPTION OF THE PREFERRED EMBODIMENT(S)

The invention provides copolymers which are derived from vinyl ester, (meth)acrylic ester and optionally ethylene comonomers and are stabilized with a protective colloid, in the form of their aqueous dispersions or polymer powders redispersible in water, and their use in building materials, where the copolymers are obtained by means of free-radically initiated emulsion or suspension polymerization of one or more esters of acrylic acid or methacrylic acid with vinyl esters, optionally also with ethylene and further monomers copolymerizable therewith, in the presence of one or more polyvinyl alcohol protective colloids wherein:

a) the vinyl ester component is polymerized, if desired in the presence of ethylene and further copolymerizable comonomers, to a conversion of from 90 to 100% by weight in a first step, and b) the ester(s) of acrylic acid or methacrylic acid is/are subsequently added and polymerized in a second step, and optionally drying the aqueous dispersion thus obtained.

Suitable acrylic acid and methacrylic acid ester monomers include esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Particular preference is given to methyl acrylate, methyl methacrylate, n-butyl acrylate and 2-ethylhexyl acrylate. Methyl methacrylate is most preferred.

The esters of acrylic acid and methacrylic acid are copolymerized in an amount of from 1 to 70% by weight, preferably from 5 to 40% by weight, in each case based on the total weight of all comonomers. If desired, one or more monomers from the group of vinylaromatics such as styrene, and dienes such as 1,3-butadiene and acrylonitrile, can be copolymerized together with the (meth)acrylic ester component in the second step of the polymerization. If such comonomers are copolymerized with the (meth)acrylic ester component, they are present in a proportion of preferably from 1 to 50% by weight based on the total weight of the monomers polymerized in the second step.

Suitable vinyl esters are vinyl esters of unbranched or branched carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms, for example VeoVa9$^R$ or VeoVa10$^R$ (trade names of Shell). Particular preference is given to vinyl acetate. The vinyl ester monomers are generally copolymerized in an amount of from 30 to 90% by weight based on the total weight of the monomers.

If ethylene is copolymerized in the first step, it is preferably present in a proportion of from 1 to 40% by weight, more preferably from 5 to 25% by weight based on the total weight of the monomers.

If desired, from 0.05 to 10% by weight, based on the total weight of the monomer mixture, of auxiliary monomers can be additionally copolymerized in the first and/or second step of the polymerization. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitiile; monoesters and diesters of fumaric acid and maleic acid, i.e. the diethyl and diisopropyl esters, and also maleic anhydride, ethylenically unsaturated sulfonic acids or their salts, preferably vinylsulfonic acid or 2-acrylamido-2-methylpropanesulfonic acid. Further examples are pre-crosslinking comonomers such as multiply ethylenically unsaturated comonomers, for example divinyl adipate, diallyl maleate, allyl methacrylate or triallyl cyanurate, or post-crosslinking comonomers, for example acrylamidoglycolic acid (AGA), methyl methacrylamido-glycolate (MMAG), N-methylolacrylamide (NMA), N-methylolmethacrylamide, allyl N-methylolcarbamate, alkyl ethers such as the isobutoxy ether or ester of N-methylolacrylamide, N-methylolmethacrylamide, or allyl N-methylolcarbamate. Also suitable are epoxy-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, where, for example, ethoxy and ethoxypropylene glycol ether radicals may be present as alkoxy groups. Mention may also be made of monomers containing hydroxy or CO groups, for example hydroxyalkyl methacrylates and acrylates, e.g. hydroxyethyl, hydroxypropyl or hydroxybutyl acrylate or methacrylate, and compounds such as diacetoneacrylamide and acetylacetoxyethyl acrylate or methacrylate.

Preference is given to copolymers of vinyl acetate and optionally ethylene, with one or more monomers including methyl acrylate, methyl methacrylate, ethyl acrylate, ethyl methacrylate, propyl acrylate, propyl methacrylate, n-butyl acrylate, n-butyl methacrylate, 2-ethylhexyl acrylate or styrene. Particular preference is given to copolymers of vinyl acetate and ethylene with one or more comonomers from among n-butyl acrylate, 2-ethylhexyl acrylate and methyl methacrylate. Vinyl acetate-methyl methacrylate copolymers and vinyl acetate-ethylene-methyl methacrylate copolymers are most preferred. The copolymers mentioned may, if desired, further include the abovementioned auxiliary monomers.

The choice of monomers and the choice of the proportions by weight of the comonomers is made in such a way that the resulting glass transition temperature $T_g$ is generally in the range from −50° C. to +50° C. The glass transition temperature $T_g$ of the polymers can be determined conventionally by means of differential scanning calorimetry (DSC). The $T_g$ can also be calculated approximately beforehand by means of the Fox equation. According to T. G. Fox, BULL. AM. PHYSICS SOC. 1, 3, page 123 (1956): $1/T_g = x_1/T_{g1} + x_2/T_{g2} + \ldots + x_n/T_{gn}$, where $x_n$ is the mass fraction (% by weight/100) of the monomer n and $T_{gn}$ is the glass transition temperature in Kelvin of the homopolymer of the monomer n. $T_g$ values for homopolymers are listed in Polymer Handbook 2nd Edition, J. Wiley & Sons, New York (1975). The molecular weight of the copolymers, expressed as Fikentscher K value (DIN 53726), is preferably from about 100 or more to about 150.

The copolymer is prepared by the emulsion polymerization or suspension polymerization, preferably by emulsion polymerization, with the polymerization temperature generally being from 40° C. to 100° C., preferably from 60° C. to 90° C. The copolymerization of gaseous comonomers such as ethylene and 1,3-butadiene can also be carried out under superatmospheric pressure, in general in the range from 5 bar to 100 bar.

The polymerization is initiated using the water-soluble or monomer-soluble initiators or redox initiator combinations customary for emulsion polymerization or suspension polymerization. Examples of water-soluble initiators are the sodium, potassium and ammonium salts of peroxydisulfuric acid, hydrogen peroxide, t-butyl peroxide, t-butyl hydroperoxide, potassium peroxydiphosphate, t-butyl peroxopivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The initiators mentioned are generally used in an amount of from 0.1 to 2.0% by weight, based on the total weight of the monomers.

As redox initiators, use is made of combinations of the abovementioned initiators in combination with reducing agents. Suitable reducing agents are the sulfites and bisulfites of the alkali metals and of ammonium, for example sodium sulfite, derivatives of sulfoxylic acid such as zinc or alkali metal formaldehyde sulfoxylates, for example sodium hydroxymethanesulfinate, and ascorbic acid. The amount of reducing agent is preferably from 0.15 to 3% by weight, based on the total weight of the monomers.

To control the molecular weight, regulators (chain transfer agents) can be used during the polymerization. If regulators are used, they are usually employed in amounts of from 0.01 to 5.0% by weight based on the monomers to be polymerized, and are metered in separately or premixed with reaction components. Examples of such substances are n-dodecyl mercaptan, t-dodecyl mercaptan, mercaptopropionic acid, methyl mercaptopropionate, isopropanol and acetaldehyde. Preference is given to carrying out the polymerization in the absence of regulators.

Suitable polyvinyl alcohols are partially hydrolyzed or fully hydrolyzed polyvinyl alcohols. Preference is given to partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015). Also suitable are partially hydrolyzed, hydrophobically modified polyvinyl alcohols having a degree of hydrolysis of from 80 to 95 mol % and a Höppler viscosity in 4% strength aqueous solution of from 1 to 30 mPas. Examples of such polyvinyl alcohols are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, olefins such as ethene and decene. The proportion of the hydrophobic units is preferably from 0.1 to 10% by weight, based on the total weight of the partially hydrolyzed polyvinyl alcohol. It is also possible to use mixtures of the polyvinyl alcohols mentioned.

Further suitable polyvinyl alcohols are partially hydrolyzed, hydrophobicized polyvinyl alcohols which are obtained by polymer-analogous reaction, for example acetalization of the vinyl alcohol units by means of $C_1$–$C_4$-aldehydes such as butyraldehyde. The proportion of hydrophobic units is preferably from 0.1 to 10% by weight, based on the total weight of the partially hydrolyzed polyvinyl acetate. The degree of hydrolysis is generally from 80 to 95 mol %, preferably from 85 to 94 mol %, and the Höppler viscosity (DIN 53015, Höppler method, 4% strength aqueous solution) is from 1 to 30 mPas, preferably from 2 to 25 mPas.

Greatest preference is given to polyvinyl alcohols having a degree of hydrolysis of from 85 to 94 mol % and a Höppler viscosity in 4% strength aqueous solution of from 3 to 15 mPas (Höppler method at 20° C., DIN 53015). The protective colloids mentioned can be obtained by methods known to those skilled in the art.

The polyvinyl alcohols are generally added in a total amount of from 1 to 20% by weight, based on the total weight of the monomers employed in the polymerization. The protective colloid can all be charged initially or part of it can be charged initially and the remainder metered in. Preference is given to initially charging at least 5% by weight of the protective colloid; most preferably, all of the protective colloid is charged initially.

The polymerization according to the present invention is preferably carried out without addition of emulsifiers. In exceptional cases, it can be advantageous to make additional use of small amounts of emulsifiers, for example from 1 to 5% by weight, based on the amount of monomers. Suitable emulsifiers include anionic, cationic and nonionic emulsifiers, for example anionic surfactants such as alkyl sulfates having a chain length of from 8 to 18 carbon atoms, alkyl or alkylaryl ether sulfates having from 8 to 18 carbon atoms in the hydrophobic radical and up to 40 ethylene oxide and/or propylene oxide units, alkylsulfonates or alkylarylsulfonates having from 8 to 18 carbon atoms, diesters and monoesters of sulfosuccinic acid with monohydric alcohols or alkylphenols, or nonionic surfactants such as alkyl polyglycol ethers or alkylaryl polyglycol ethers having from 8 to 40 ethylene oxide units.

In both polymerization steps, the respective monomers can in each case be metered in in their entirety during the polymerization or part of them can be initially charged and the remainder metered in after initiation of the polymerization. The metered additions can be carried out separately (in space and in time) or all or some of the components to be metered in can be metered in in preemulsified form. The monomer conversion is controlled by means of the addition of initiator in both polymerization steps. The overall introduction of the initiators is carried out so that the polymerization is essentially continuous.

The second step of the polymerization, acrylate polymerization, is preferably commenced when the first step has reached a conversion of $\geq 95\%$ by weight. The weight ratio of first step polymer to second step polymer is preferably in the range from 95:5 to 60:40.

After the polymerization is substantially complete, an after-polymerization can be carried out by known methods to remove residual monomer, for example by means of after-polymerization initiated by a redox catalyst. Volatile residual monomers can also be removed by means of distillation, preferably under reduced pressure, and, if desired, with inert stripping gases such as air, nitrogen or steam being passed through or over the dispersion.

The aqueous dispersions obtained generally have a solids content of from 30 to 75% by weight, preferably from 50 to 60% by weight. To produce polymer powders which are redispersible in water, the aqueous dispersions are optionally dried, for example by means of fluidized-bed drying, freeze drying or spray drying after addition of protective colloids as spraying aids. The dispersions are preferably spray dried. Spray drying may be carried out in customary spray dryers, and atomization may be achieved by means of single-fluid, two-fluid or multifluid nozzles or by means of a rotary disk. The outlet temperature is generally set in the range from 45° C. to 120° C., preferably from 60° C. to 90° C., depending on the spray dryer, the $T_g$ of the resin, and the desired degree of drying.

In general, the optional spraying aid is used in a total amount of from 3 to 30% by weight, based on the polymeric constituents of the dispersion, i.e. the total amount of protective colloid before drying should be from at least 3 to 30% by weight based on the polymer weight. Preference is given to using from 5 to 20% by weight based on the polymer weight.

Suitable spraying aids are partially hydrolyzed polyvinyl alcohols; polyvinylpyrrolidones; polysaccharides in water-soluble form, i.e. starches such as amylose and amylopectin, celluloses and their carboxymethyl, methyl, hydroxyethyl and hydroxypropyl derivatives; proteins such as casein or caseinate, soya protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers. Preference is given to using no further protective colloids other than polyvinyl alcohols as spraying aids.

In spraying, an amount of up to 1.5% by weight of antifoam, based on the base polymer, has frequently been found to be useful. To increase the shelf life by improving the blocking resistance, in particular in the case of powders having a low glass transition temperature, the powder obtained can be admixed with an antiblocking agent (anticaking agent), preferably in an amount of up to 30% by weight based on the total weight of polymeric constituents. Examples of antiblocking agents are calcium carbonate or magnesium carbonate, talc, gypsum, silica, kaolins and silicates, preferably having particle sizes in the range from 10 nm to 10 $\mu$m.

The viscosity of the feed to be sprayed is established via the solids content so that the Brookfield viscosity at 20 rpm and 23° C. is less than 500 mPas, preferably less than 250 mPas. The solids content of the dispersion to be sprayed is greater than 35%, preferably greater than 40%.

To improve the application properties, further additives can be added in the spray drying process. Further constituents which are present in preferred embodiments of dispersion powder compositions are, for example, pigments, fillers, foam stabilizers, and hydrophobicizing agents.

The aqueous polymer dispersions and the polymer powders which are stabilized by protective colloids and are redispersible in water are used in building material compositions, for example in building products in conjunction with hydraulically setting binders such as cements (i.e. portland, alumina, pozzolanic, slag, magnesia and phosphate cements), plaster of Paris, and/or water glass. Examples of the building products include building adhesives, plasters and renders, knifing fillers, flooring screeds, sealing slurries, jointing mortars, and paints.

By the term "water-based building materials" is meant, in a non-limiting sense, settable building materials based on substantially inorganic ingredients such as cement, lime, plaster, etc., generally including mineral fillers such as sand, stone, gravel, etc., which may in addition contain non-mineral ingredients such as compacting aids, retardants, accelerators, viscosifiers, thixotropes, fibrous reinforcement, polymer additives, etc. Examples include stuccos, plasters, renders, grouts, screeds, troweling compounds, concrete, mortar cementitious and non-cementitious adhesives, and the like. The term "building material" does not include substantially organic materials such as wood, particle board, polymer adhesives and polymeric sealants.

To produce the building material compositions, the polymer dispersion or the polymer powder is mixed in appropriate mixers with the further constituents of the formulation, e.g. cement, filler and further additives, and homogenized. The dispersion powder can, if desired, also be added at the building site in the form of an aqueous redispersion. Preference is given to producing a dry mix and adding the water required for processing immediately before processing. In the production of paste-like building adhesives, the water is generally initially charged, the dispersion or the powder added, and the solids subsequently stirred in.

The dispersions or powders are preferably used in cement-containing building adhesive formulations. Typical formulations comprise from 5 to 80% by weight of cement, from 5 to 80% by weight of fillers such as quartz sand, calcium carbonate or talc, from 0.1 to 2% by weight of thickeners such as cellulose ethers, layered silicates, and polyacrylates, with from 0.1 to 60% by weight of the copolymers stabilized by protective colloids in the form of their polymer dispersions or polymer powders and, if desired, further additives for improving non-slump properties, processibility, open time and water resistance. The figures in % by weight are always based on 100% by weight of dry materials in the formulation. The cement-containing building adhesive formulations described are used, in particular, in the laying of tiles of all types, i.e. earthenware, stoneware, fine stoneware, ceramic, and natural tiles in interior and exterior applications as tile adhesives, and as thermal insulation adhesives, and are mixed with the appropriate amount of water before use.

The copolymers stabilized by protective colloids are also suitable for use in cement-free building adhesive formulations, for example using the corresponding amount of plaster of Paris as inorganic binder in the abovementioned formulation. The cement-free building adhesive formulations are used, in particular, as tile adhesives in the laying of tiles of all types, i.e. earthenware, stoneware, fine stoneware, ceramic, or natural tiles, and in the bonding of polystyrene boards onto exterior walls of buildings as thermal insulation.

The aqueous dispersions of the copolymers stabilized by protective colloids are also used in paste-like building adhesive formulations having the above-described composition in respect of inorganic binder, filler and thickener. Paste-like building adhesives may be used as tile adhesives and as adhesives for thermal insulation.

The following examples serve to illustrate the invention:

COMPARATIVE EXAMPLE C1 (ANALOGOUS to DE-A 19962566)

2,830 g of water, 2,220 g of a 20% strength aqueous solution of a polyvinyl alcohol having a degree of hydrolysis of 88 mol % and a Höppler viscosity of 4 mPas, 5 g of iron ammonium sulfate (1% strength in water) and 4,860 g of vinyl acetate were placed in a polymerization vessel having a volume of 5 liters and the mixture was heated to 85° C. At the same time, the vessel was pressurized with 50 bar of ethylene. tert-Butyl hydroperoxide (10% strength in water) and Brüggolit (sodium hydroxymethanesulfinate, 5% strength in water) were subsequently metered in continuously at rates of 60 and 200 g/h, respectively. After commencement of the polymerization, which was recognizable by an increase in the internal temperature, the remaining monomer mixture consisting of 1,210 g of methyl methacrylate was metered in continuously over a period of 3 hours at a rate of 403 g/h. In parallel to the introduction of monomer, 760 g of a 12% strength polyvinyl alcohol solution (polyvinyl alcohol as above) were metered in over a period of 3 hours at a rate of 254 g/h. Polymerization was continued until no more heat of polymerization was observed. To remove residual monomer, the mixture was cooled to 30° C. and then subjected to after-polymerization using 40 g of tert-butyl hydroperoxide (10% strength in water) and 40 g of Brüggolit (10% strength in water), yielding a dispersion having a solids content of 49.3%, a viscosity of 620 mPas (Brookfield 20 at 23° C.), a pH of 3.7, and a particle diameter $D_w$ of 1,300 nm. The sieve residue on a 250 μm sieve was 14 g. The K value was 68, and the free residual monomer content was less than 100 ppm. The dispersion was stable in cement. The polymer had a $T_g$ of 20° C. and a tear strength in a polymer film of 15 N/mm² at an elongation of 260%.

COMPARATIVE EXAMPLE C2

A dispersion was prepared by a method analogous to comparative example C1, except that all the methyl methacrylate was included in the initial charge. This gave a dispersion which, however, coagulated on cooling.

COMPARATIVE EXAMPLE C3

A dispersion was prepared by a method analogous to comparative example C1, except that no methyl methacrylate comonomer was employed. The $T_g$ of the vinyl acetate-ethylene copolymer was established at 15° C. by the amount of ethylene copolymerized, yielding a dispersion having a solids content of 55.2%, a viscosity of 550 mPas (Brookfield 20 at 23° C.), a pH of 4.1, and a particle diameter $D_w$ of 1,100 nm. The sieve residue on a 250 μm sieve was 350 g. The K value was 110, and the free residual monomer content was less than 1,000 ppm. The dispersion was stable in cement. The polymer had a $T_g$ of 15° C. and a tear strength in a polymer film of 14 N/mm² at an elongation of 320%.

EXAMPLE 1

100 kg of water, 71.7 kg of a 20% strength aqueous solution of a polyvinyl alcohol having a degree of hydrolysis of 88 mol % and a Höppler viscosity of 4 mPas, 500 g of iron ammonium sulfate (1% strength in water) and 165.5 kg of vinyl acetate were placed in a polymerization reactor having a volume of 590 liters and the mixture was heated to 55° C. At the same time, the vessel was pressurized with 55 bar of ethylene, corresponding to 52 kg. tert-Butyl hydroperoxide (5% strength in water) and Brüggolit sodium hydroxymethanesulfmate, 2.5% strength in water were subsequently metered in continuously at rates of 600 and 1,020 g/h, respectively. After commencement of the polymerization, which was recognizable by an increase in the internal temperature, the internal temperature was increased to 85° C.

After 2.5 hours, the continuous metered addition of 55.2 kg of methyl methacrylate and 40.8 kg of a 20% strength aqueous solution of a polyvinyl alcohol having a degree of hydrolysis of 88 mol % and a Höppler viscosity of 4 mPas over a period of 2 hours was commenced. At the same time, the initiator feed rates were increased to 3,000 g/h of tert-butyl hydroperoxide (5% strength in water) and 5,100 g/h Brüggolit (sodium hydroxymethanesulfinate, 2.5% strength in water, respectively. Polymerization was continued until no more heat of polymerization was observed. Remaining gas was vented, and after cooling to 30° C., an after-polymerization to remove residual monomer was carried out using 750 g of tert-butyl hydroperoxide (10% strength in water) and 650 g of Brüggolit (10% strength in water), yielding a dispersion having a solids content of 54.2%, a viscosity of 300 mPas (Brookfield 20 at 23° C.), a pH of 4.2, and a particle diameter $D_w$ of 2 580 nm. The sieve residue on a 250 μm sieve was 400 g. The K value was 110, and the free residual monomer content was less than 1,000 ppm. The dispersion was stable in cement. The polymer had a $T_g$ of 1° C. and a tear strength in a polymer film of 19 N/mm² at an elongation of 360%.

EXAMPLE 2

The polymerization was carried out by a method analogous to example 1, but 60 kg of ethylene were used, yielding a dispersion having a solids content of 54.2%, a viscosity of 290 mPas (Brookfield 20 at 23° C.), a pH of 4.1, and a particle diameter $D_w$ of 2,310 nm. The sieve residue on a 250 μm sieve was 130 g. The K value was 111, and the free residual monomer content was less than 1,000 ppm. The dispersion was stable in cement. The polymer had a $T_g$ of −3° C. and a tear strength in a polymer film of 13.6 N/mm² at an elongation of 380%.

EXAMPLE 3

The polymerization was carried out by a method analogous to example 1, but using 55 kg of ethylene. In addition, potassium persulfate was used in place of tert-butyl hydroperoxide in the polymerization, yielding a dispersion having a solids content of 53.2%, a viscosity of 270 mPas (Brookfield 20 at 23° C.), a pH of 4.3, and a particle diameter $D_w$ of 1,910 nm. The sieve residue on a 250 μm sieve was 300 g. The K value was 115, and the free residual monomer content was less than 1,000 ppm. The dispersion was stable in cement. The polymer had a $T_g$ of 1° C. and a tear strength in a polymer film of 18 N/mm² at an elongation of 340%.

EXAMPLE 4

The polymerization was carried out by a method analogous to example 1, but 36 kg of ethylene were used, yielding a dispersion having a solids content of 53.7%, a viscosity of 390 mPas (Brookfield 20 at 23° C.), a pH of 3.7, and a particle diameter $D_w$ of 860 nm. The sieve residue on a 250 μm sieve was 230 g. The K value was 97, and the free residual monomer content was less than 1,000 ppm. The dispersion was stable in cement. The polymer had a $T_g$ of 14° C. and a tear strength in a polymer film of 27.6 N/mm² at an elongation of 270%.

EXAMPLE 5

The polymerization was carried out by a method analogous to example 1, but 45 kg of ethylene were used, yielding a dispersion having a solids content of 53.7%, a viscosity of 370 mPas (Brookfield 20 at 23° C.), a pH of 3.7, and a particle diameter $D_w$ of 730 nm. The sieve residue on a 250 μm sieve was 120 g. The K value was 113, and the free residual monomer content was less than 1,000 ppm. The dispersion was stable in cement. The polymer had a $T_g$ of 7° C. and a tear strength in a polymer film of 21 N/mm² at an elongation of 320%.

EXAMPLE 6

The polymerization was carried out using a method analogous to example 4, but 50% by weight of the methyl methacrylate was replaced by styrene, yielding a dispersion having a solids content of 51.8%, a viscosity of 240 mPas (Brookfield 20 at 23° C.), a pH of 3.9, and a particle diameter $D_w$ of 980 nm. The sieve residue on a 250 μm sieve was 180 g. The K value was 105, and the free residual monomer content was less than 1,000 ppm. The dispersion was stable in cement. The polymer had a $T_g$ of 5° C. and a tear strength in a polymer film of 15.5 N/mm² at an elongation of 300%.

Production of Powder

The dispersions from examples 1 to 6 and Comparative Examples C1 to C3 were admixed with 5% by weight (solid/solid) of polyvinyl alcohol having a degree of hydrolysis of 88 mol % and a Höppler viscosity of 4 mPas and diluted with water to a diluted viscosity of 250 mPas. The dispersions were then spray dried by means of a two-fluid nozzle. Atomization was carried out using air which had been compressed to 4 bar, and the droplets formed were dried in cocurrent air heated to 125° C. The dry powders obtained were admixed with 10% by weight of commercial antiblocking agent (mixture of calcium magnesium carbonate and magnesium hydrosilicate).

Redispersion Behavior of Polymer Films 0.2 mm thick films were produced from the dispersions from the abovementioned examples (before spray drying) on glass plates and these were dried at 105° C. for 15 minutes. To test the film redispersibility, one drop of water was in each case applied at room temperature by means of a pipette to a homogeneous area on the film to be tested, and after the drop of water had been allowed to act on the film for 60 seconds, the drop was rubbed with a fingertip on the same spot until the glass plate was free of film at this place, the film disintegrated into pieces or was fully retained. The redispersibility of the polymer films was assessed according to the following evaluation scale:

grade 1: film can be redispersed immediately by gentle rubbing or redisperses on its own;
grade 2: film can be redispersed by rubbing, few redispersible film pieces possible;
grade 3: film can be redispersed only by vigorous rubbing with formation of film pieces;
grade 4: film cannot be redispersed even by prolonged vigorous rubbing, but instead disintegrates into pieces.

Determination of Sedimentation Behavior (tube sedimentation)

To determine the sedimentation behavior, 50 g of the dispersion powder were in each case redispersed in 50 ml of water, then diluted to a solids content of 0.5% and 100 ml of this redispersion was placed in a graduated tube and sedimentation was measured after 1 hour.

Determination of the Blocking Resistance

To determine the blocking resistance, the dispersion powder was placed in an iron tube having a screw cap and pressure was then applied by means of a metal punch. After compression, the tube and contents were stored at 50° C. for 16 hours in a drying oven. After cooling to room temperature, the powder was removed from the tube and the blocking resistance was determined qualitatively by crushing the compacted powder. The blocking resistance was classified as follows:

1=very good blocking resistance
2=good blocking resistance
3=satisfactory blocking resistance
4=not resistant to blocking, powder was no longer free-flowing after crushing.

Determination of Cement Stability

A cement mixture was made up according to the following formulation:

| | |
|---|---|
| portland cement | 82.5 g |
| calcite (CaCO$_3$, 10–40 mm) | 75.0 g |
| quartz sand (200–500 mm) | 142.0 g |
| dispersion powder | 14.5 g |
| water | 85.0 g |

The processibility of the cement mixture was observed and assessed qualitatively over a period of 2 hours.

The test results are summarized in Table 1.

TABLE 1

| Example | Redispersibility | Sedimentation in a tube [cm] | Blocking resistance | Cement stability |
|---|---|---|---|---|
| 1 | 1 | 1.5 | 1 | stable |
| 2 | 1 | 2 | 1–2 | stable |
| 3 | 1 | 1 | 1 | stable |
| 4 | 1 | 1 | 1 | stable |
| 5 | 1 | 1 | 1 | stable |
| C1 | 1 | 1 | 1 | stable |
| C3 | 1 | 1.5 | 1 | stable |

The results presented in Table 1 show that polymer products obtained according to the invention have a cement stability comparable to that of standard vinyl acetate-ethylene powders or vinyl acetate-ethylene-methyl methacrylate terpolymers produced by a single-stage process. At a significantly lower $T_g$, the mechanical strengths in a polymer film and in the building material composition are considerably improved compared to the standard. At a comparable $T_g$, even better values are observed.

Tensile bond strengths in a tile adhesive were tested in the following formulation:

| | |
|---|---|
| quartz sand | 601 or 641 parts |
| portland cement | 350 parts |
| cellulose | 4 parts |
| dispersion powder | 45 or 5 parts |

The tensile bond strengths were determined after 4 storage conditions:

| | |
|---|---|
| 28D: | 28 days dry storage |
| 7D/21W: | 7 days dry storage/21 days wet storage |
| 14D/14HS + 70° C./1D: | 14 days dry storage/14 days hot storage |
| freeze/thaw: | storage with freeze/thaw cycles |

The results for a polymer powder content of 0.5 and 4.5% by weight are summarized in tables 2 and 3.

TABLE 2

| 4.5% powder Example | EB % | TS N/mm$^2$ | 28D N/mm$^2$ | 7D/21W N/mm$^2$ | 14D/14HS + 70 C. °/1D N/mm$^2$ | Freeze/thaw N/mm$^2$ |
|---|---|---|---|---|---|---|
| 1 | 360 | 19 | 1.62 | 1.13 | 1.38 | 1.25 |
| 2 | 380 | 13.6 | 1.69 | 1.08 | 1.4 | 1.27 |
| 3 | 340 | 18 | 1.65 | 1.08 | 1.41 | 1.27 |
| 4 | 270 | 27.6 | 1.76 | 1.14 | 1.65 | 1.29 |
| 5 | 320 | 21 | 1.55 | 1.16 | 1.4 | 1.35 |
| 6 | 300 | 15.5 | 1.62 | 1.18 | 1.45 | 1.32 |
| C1 | 260 | 15 | 1.55 | 1.05 | 1.25 | 1.1 |
| C3 | 320 | 14 | 1.64 | 1.04 | 1.37 | 1.2 |

TABLE 3

| 0.5% powder Example | EB % | TS N/mm² | 28D N/mm² | 7D/21W N/mm² | 14D/14HS + 70 C. °/1D N/mm² | Freeze/ thaw N/mm² |
|---|---|---|---|---|---|---|
| 1 | 360 | 19 | 1.01 | 1.01 | 0.57 | 1.21 |
| 2 | 380 | 13.6 | 1.06 | 0.98 | 0.54 | 1.28 |
| 3 | 340 | 18 | 1.08 | 1.02 | 0.57 | 1.25 |
| 4 | 270 | 27.6 | 1.16 | 1.07 | 0.58 | 1.27 |
| 5 | 320 | 21 | 1.07 | 1.17 | 0.58 | 1.21 |
| 6 | 300 | 15.5 | 1.05 | 1.12 | 0.51 | 1.23 |
| C1 | 260 | 15 | 1.02 | 0.95 | 0.4 | 1.1 |
| C3 | 320 | 14 | 1.04 | 0.92 | 0.3 | 1.14 |

Satisfactory results under all storage conditions and for both formulations are obtained only when using the powders of the invention. Particularly in the case of a polymer powder content of 0.5% by weight, values of 0.5 N/mm² after hot storage (C1 standard) are achieved only with the powders of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise.

What is claimed is:

1. A building material composition, comprising
   a) a dry mix suitable for preparing a water-based, settable building material upon addition of water;
   b) a polyvinyl alcohol protective colloid-stabilized copolymer based on vinyl ester monomers, (meth)acrylic ester monomer(s) and optionally ethylene, in the form of an aqueous dispersion or in the form of a redispersible polymer powder, said copolymer prepared by the process of
      b)i) in a first step, polymerizing vinyl ester monomer(s) and optionally ethylene and further copolymerizable comonomer(s) in aqueous medium to a conversion of 90 to 100% by weight based on the total weight of polymerizable monomers added in said first step, in the presence of at least one polyvinyl alcohol colloidal stabilizer, wherein ethylene, when present in said first step, is present in an amount of 40 weight percent or less based on the weight of all polymerizable monomers in said first step,
      b)ii) in a second step, adding and polymerizing one or more (meth)acrylic acid esters, to form a copolymer dispersion, and
      b)iii) when the copolymer is a redispersible powder, drying said copolymer dispersion.

2. The composition of claim 1, wherein the esters of (meth)acrylic acid are copolymerized in an amount of from 1 to 70% by weight, based on the total weight of all comonomers.

3. The composition of claim 1, wherein the esters of (meth)acrylic acid are copolymerized in an amount of from 5 to 40% by weight based on the total weight of all comonomers.

4. The composition of claim 1, wherein said copolymers comprise copolymers of vinyl acetate and optionally ethylene, with one or more monomers selected from the group consisting of methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene.

5. The composition of claim 1, wherein said copolymer comprises a vinyl acetate-methyl methacrylate copolymer or a vinyl acetate-ethylene-methyl methacrylate copolymer, both of which may further comprise styrene and/or auxiliary monomers.

6. The composition of claim 1, wherein the glass transition temperature Tg of the copolymer is from −50° C. to +50° C. and the molecular weight of the copolymers, expressed as Fikentscher K value measurement in accordance with DIN 53726, is from 100 to 150.

7. The composition of claim 1, wherein the copolymers are stabilized with a partially hydrolyzed polyvinyl alcohol or with a partially hydrolyzed, hydrophobically modified polyvinyl alcohol, in each case having a degree of hydrolysis of from 80 to 95 mol % and a Höppler viscosity in 4% strength aqueous solution of from 1 to 30 mPas measured according to the Höppler method at 20° C., DIN 53015.

8. The composition of claim 1, wherein said building material comprises a hydraulically setting binder in a building adhesive, a plaster composition or render, a knifing filler, a flooring screed, a sealing slurry, a jointing mortar, or a paint.

9. The composition of claim 8 wherein said building material comprises a cement-containing building adhesive formulation comprising from 5 to 80% by weight of cement, from 5 to 80% by weight of fillers, from 0.1 to 2% by weight of thickeners and from 0.1 to 60% by weight of the copolymers stabilized by protective colloids in the form of a polymer dispersion or a redispersible polymer powder, where the percentages by weight are based on 100% by weight of dry matter in the formulation.

10. The composition of claim 9 wherein said building material comprises a tile adhesive or a thermal insulation adhesive.

11. The composition of claim 8 wherein said building material comprises a cement-free building adhesive formulation which is a tile adhesive or a thermal insulation adhesive.

12. The composition of claim 8 wherein said building material composition employs an aqueous dispersion of the copolymer(s) stabilized by protective colloids in a paste-like building adhesive formulation which is a tile adhesive or a thermal insulation adhesive.

13. In a dry mix suitable for the preparation of a water-based settable building material upon addition of water, the improvement comprising adding to said dry mix a redispersible copolymer powder comprising a polyvinyl alcohol protective colloid-stabilized copolymer based on vinyl ester monomers, (meth)acrylic ester monomer(s) and optionally ethylene, in the form of a redispersible polymer powder, said copolymer prepared by the process of
   a) in a first step, polymerizing vinyl ester monomer(s) and optionally ethylene and further copolymerizable comonomer(s) in aqueous medium to a conversion of 90 to 100% by weight based on the total weight of polymerizable monomers added in said first step, in the presence of at least one polyvinyl alcohol colloidal stabilizer, wherein ethylene, when present in said first step, is present in an amount of 40 weight percent or less based on the weight of all polymerizable monomers in said first step,
   b) in a second step, adding and polymerizing one or more (meth)acrylic acid esters to form a copolymer dispersion, and
   c) drying said copolymer dispersion to form said redispersible copolymer powder.

14. The dry mix of claim 13, comprising from 5 to 80% by weight of cement, from 5 to 80% by weight of fillers, from 0.1 to 2% by weight of thickeners and from 0.1 to 60% by weight of the copolymers stabilized by protective colloids in the form of a redispersible polymer powder, where the percentages by weight are based on 100% by weight of dry matter in the formulation.

15. The dry mix of claim 13, wherein the esters of (meth)acrylic acid are copolymerized in an amount of from 1 to 70% by weight, based on the total weight of all comonomers.

16. The dry mix of claim 13, wherein the esters of (meth)acrylic acid are copolymerized in an amount of from 5 to 40% by weight based on the total weight of all comonomers.

17. The dry mix of claim 13, wherein said copolymers comprise copolymers of vinyl acetate and optionally ethylene, with one or more monomers selected from the group consisting of methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene.

18. The dry mix of claim 13, wherein said copolymer comprises a vinyl acetate-methyl methacrylate copolymer or a vinyl acetate-ethylene-methyl methacrylate copolymer, both of which may further comprise styrene and/or auxiliary monomers.

19. A process for the preparation of a water-based settable building material composition of claim 1, comprising adding said copolymer in the form of its aqueous dispersion to one or more of dry ingredients of said building material composition, and optionally adding water to form a water-based settable building composition.

20. A process for the preparation of a water-based settable building composition of claim 1, comprising adding water to dry ingredients of said building material composition and adding said copolymer in the form of its aqueous dispersion or as a redispersible polymer powder, and optionally adding further water to form a water-based settable building material composition.

21. The composition of claim 1, wherein ethylene in said first step b)i) is present in an amount of from 5 weight percent to 25 weight percent based on the total weight of all monomers in said first step.

22. The composition of claim 1, wherein the monomers employed in said second step are one or more (meth)acrylic acid esters and optionally one or more further monomers selected from the group consisting of vinyl aromatics, dienes, and acrylonitrile.

23. The composition of claim 1, wherein the monomers employed in said second step consist of one or more (meth)acrylic acid esters and styrene.

24. The composition of claim 1, wherein the monomers employed in said second step consist of one or more (meth)acrylic acid esters and butadiene.

25. The composition of claim 1 wherein the weight ratio of polymer formed in said first step to polymer formed in said second step is from 95:5 to 60:40.

26. A building material composition, comprising
a) a dry mix suitable for preparing a water-based, settable building material upon addition of water;
b) a polyvinyl alcohol protective colloid-stabilized copolymer based on vinyl ester monomers, (meth)acrylic ester monomer(s) and optionally ethylene, in the form of an aqueous dispersion or in the form of a redispersible polymer powder, said copolymer prepared by the process of
b)i) in a first step, polymerizing vinyl ester monomer(s) and optionally ethylene and further copolymerizable comonomer(s) in aqueous medium to a conversion of 90 to 100% by weight based on the total weight of polymerizable monomers added in said first step, in the presence of at least one polyvinyl alcohol colloidal stabilizer wherein ethylene, when present in said first step, is present in an amount of 40 weight percent or less based on the weight of all polymerizable monomers in said first step,
b)ii) in a second step, adding and polymerizing a monomer mixture consisting essentially of one or more (meth)acrylic acid esters, and optionally one or more monomers selected from the group consisting of vinyl aromatics dienes, and acrylonitrile,
wherein up to 10% by weight of one or more auxiliary monomers, based on the total weight of all monomers employed in said first step and said second step may be added and copolymerized during said first step, said second step, or during said first and said second steps;
b)iii) when the copolymer is a redispersible powder, drying said copolymer dispersion.

27. The composition of claim 26, wherein ethylene is present in said first step in an amount of from 5 to 25 weight percent based on the weight of all monomers employed in said first step.

28. A building material composition, comprising
a) a dry mix suitable for preparing a water-based, settable building material upon addition of water;
b) a polyvinyl alcohol protective colloid-stabilized copolymer based on vinyl ester monomers, (meth)acrylic ester monomer(s) and optionally ethylene, in the form of an aqueous dispersion or in the form of a redispersible polymer powder, said copolymer prepared by the process of
b)i) in a first step, polymerizing at least one vinyl ester monomer, optionally ethylene, optionally further copolymerizable monomers, and optionally one or more auxiliary monomers, and optionally one or more auxiliary monomers to a conversion of 90 to 100% by weight based on the total weight of all polymerizable monomers added in said first step, in the presence of at least one polyvinyl alcohol colloidal stabilizer;
b)ii) in a second step, adding and polymerizing a comonomer mixture consisting of one or more (meth)acrylic acid esters, optionally one or more monomers selected from the group consisting of vinyl aromatics, dienes, and acrylonitrile, and optionally one or more auxiliary monomers,
wherein the total amount of auxiliary monomers employed in said first step and said second step is less than 10 weight percent of the total weight of all monomers employed in said first and said second steps;
b)iii) when the copolymer is a redispersible powder, drying said copolymer dispersion.

29. The composition of claim 28 wherein in said first step, vinyl acetate and from 1 to 40 weight percent ethylene are the sole monomers, and wherein in said second step, the sole monomers other than (meth)acrylic acid esters are selected from the group consisting of styrene, dienes, acrylonitrile, and auxiliary monomers.

* * * * *